(12) United States Patent
Schrag et al.

(10) Patent No.: US 10,132,672 B2
(45) Date of Patent: Nov. 20, 2018

(54) DIGITAL LINEARIZATION IN A WEIGHING CELL

(71) Applicant: Mettler-Toledo GmbH, Greifensee (CH)

(72) Inventors: Daniel Schrag, Lufingen (CH); Daniel Rupp, Felben-Wellhausen (CH); Christoph Trautweiler, Regensdorf (CH); Hans-Rudolf Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 154 days.

(21) Appl. No.: 15/255,936

(22) Filed: Sep. 2, 2016

(65) Prior Publication Data
US 2016/0370221 A1    Dec. 22, 2016

Related U.S. Application Data

(63) Continuation-in-part of application No. 14/228,861, filed on Mar. 28, 2014.

(30) Foreign Application Priority Data

Mar. 28, 2013  (EP) .................................... 13161569

(51) Int. Cl.
*G01G 7/04* (2006.01)
*G01G 23/01* (2006.01)
(Continued)

(52) U.S. Cl.
CPC ................. *G01G 7/02* (2013.01); *G01G 7/04* (2013.01); *G01G 23/01* (2013.01); *G01G 3/1414* (2013.01)

(58) Field of Classification Search
CPC .......... G01G 7/02; G01G 7/04; G01G 3/1414; G01G 23/01; G01G 23/012
See application file for complete search history.

(56) References Cited

U.S. PATENT DOCUMENTS 3,142,349 A    7/1964  Blodgett
3,484,813 A   12/1969  Davies
(Continued)

FOREIGN PATENT DOCUMENTS

JP    62-193528 U    12/1987
JP    5-332816 A    12/1993
(Continued)

OTHER PUBLICATIONS

Franklin, Gene F. et al., Feedback Control of Dynamic Systems, May 1987, pp. 56-61, 64-67, Addison-Wesley Publishing Company, Reading, Massachusetts.
(Continued)

*Primary Examiner* — Randy Gibson
(74) *Attorney, Agent, or Firm* — Standley Law Group LLP

(57) ABSTRACT

A force exerted by a load is determined in a force-measuring device (1) operating under electromagnetic force compensation. The device includes a measurement transducer (18, 118) with a coil (20, 120) movably immersed in a magnet system (19, 119) and a force-transmitting mechanical connection between a load-receiving part (12, 112) and the coil or magnet system. A position sensor (21, 28), also part of the device, determines a displacement of the coil from its settling position relative to the magnet system (19, 119) which occurs when the load is placed on the load-receiving part. An electrical current (24) flowing through the coil generates an electromagnetic force between the coil and the magnet system whereby the coil and the load-receiving part are returned to, and/or held at, the settling position. The
(Continued)

magnitude of current and the amount of displacement are used to determine the weight force exerted by the load.

17 Claims, 5 Drawing Sheets

(51) Int. Cl.
  *G01G 7/02* (2006.01)
  *G01G 3/14* (2006.01)

(56) References Cited

U.S. PATENT DOCUMENTS

| | | | |
|---|---|---|---|
| 3,643,753 A | 2/1972 | Godwin et al. | |
| 3,800,893 A | 4/1974 | Ramsay et al. | |
| 4,231,439 A | 11/1980 | Hall, Jr. et al. | |
| 4,709,770 A | 12/1987 | Kohashi et al. | |
| 4,778,018 A * | 10/1988 | Cordery | G01G 3/16 177/154 |
| 4,802,541 A | 2/1989 | Bator et al. | |
| 4,890,246 A * | 12/1989 | Oldendorf | G01G 23/012 177/1 |
| 4,930,588 A | 6/1990 | Kuhlmann et al. | |
| 4,932,487 A * | 6/1990 | Melcher | G01G 21/286 177/180 |
| 5,117,929 A | 6/1992 | Nakamura et al. | |
| 5,271,398 A * | 12/1993 | Schlain | A61B 5/1459 600/322 |
| 5,367,128 A | 11/1994 | Tsukasa et al. | |
| 6,559,391 B2 | 5/2003 | Huebler et al. | |
| 6,759,602 B2 | 7/2004 | Miller et al. | |
| 6,861,593 B2 * | 3/2005 | Kuhlmann | G01G 23/012 177/210 EM |
| 7,247,801 B2 | 7/2007 | Salazar et al. | |
| 7,358,450 B2 | 4/2008 | Hübler et al. | |
| 7,596,984 B2 * | 10/2009 | Genoud | G01G 23/012 177/1 |
| 8,698,012 B2 | 4/2014 | Huebler et al. | |
| 9,027,380 B2 * | 5/2015 | Burkhard | G01G 7/04 73/1.13 |
| 2016/0011038 A1 * | 1/2016 | Schrag | G01G 7/045 177/1 |

FOREIGN PATENT DOCUMENTS

| | | |
|---|---|---|
| JP | 10-104045 A | 4/1998 |
| JP | 3513597 B2 | 1/2004 |
| JP | 2012-173248 A | 9/2012 |
| JP | 5723825 B2 | 4/2015 |

OTHER PUBLICATIONS

Glisson, T.H., Introduction to System Analysis, 1985, pp. 110-137, 158-161, McGraw-Hill Book Company, New York.

* cited by examiner

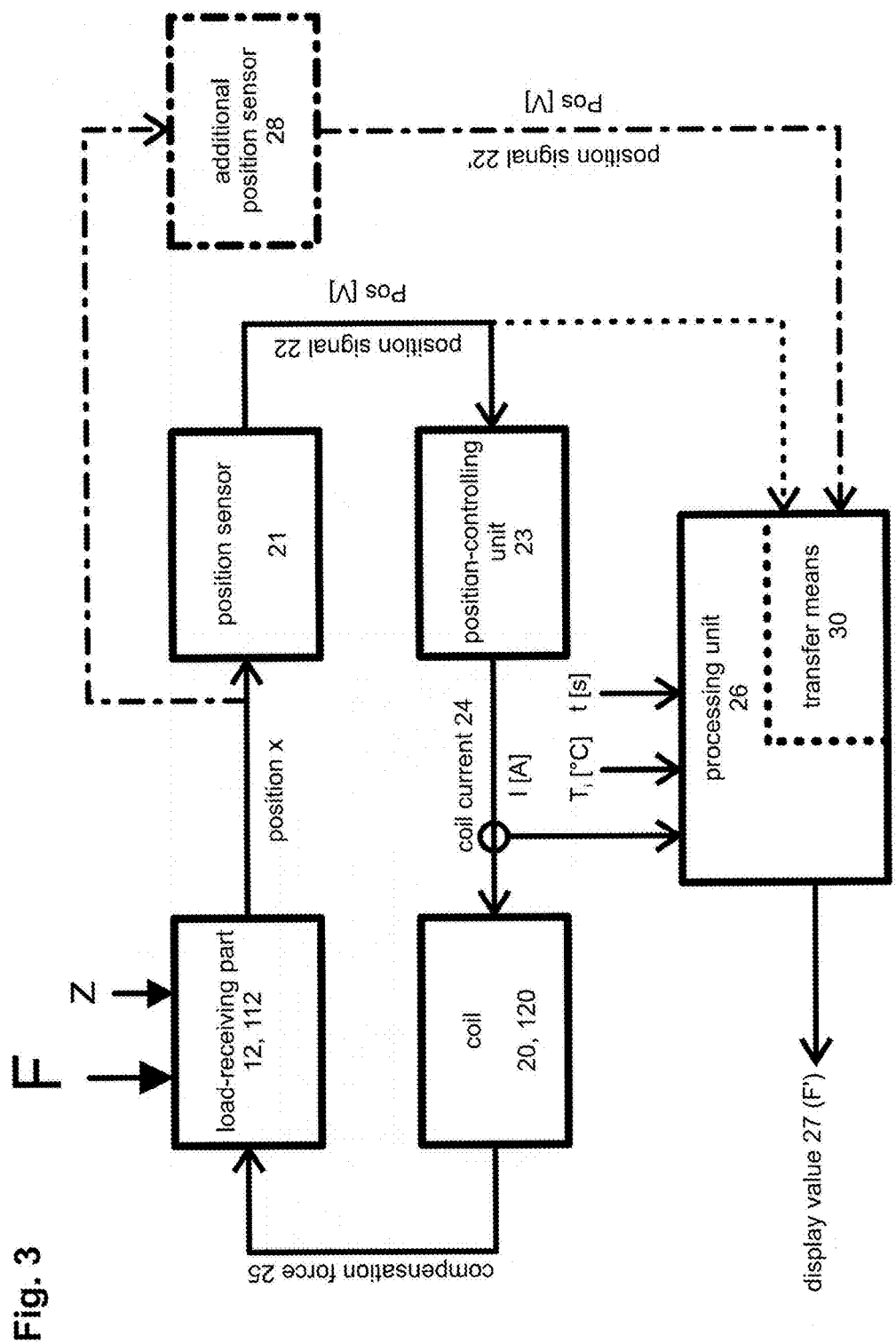

DIGITAL LINEARIZATION IN A WEIGHING CELL

CROSS-REFERENCE TO RELATED APPLICATIONS

This application is a continuation in part of U.S. application Ser. No. 14/228,861, filed on 28 Mar. 2014, which is entitled to benefit of a right of priority under 35 USC § 119 from European patent application 13161569, filed on 28 Mar. 2013, the content of which is incorporated by reference as if fully recited herein.

TECHNICAL FIELD

The invention concerns a method of determining a weight force by means of a force-measuring device.

BACKGROUND

In force-measuring devices, for example in a type of weighing cells that operate according to the principle of electromagnetic force compensation, also known as electromagnetic force restoration or EMFR, the weight force of the weighing object is transmitted either directly or by way of one or more fulcrum-supported force-transmission levers to an electromechanical measurement transducer. The measurement transducer generates a compensation force that matches the weight force of the weighing object and delivers an electrical signal which is processed and displayed by an electronic aggregate, the signal-processing unit.

An EMFR weighing cell includes in most cases a parallelogram mechanism with a stationary parallel leg and a movable parallel leg which is connected to the stationary parallel leg by two parallel guides and serves as load receiver. In EMFR weighing cells with lever systems the weight force is transmitted, by way of a coupling element that rigidly maintains its length but is flexible in bending, to a balance beam that is pivotally supported on the stationary parallel leg. The purpose of such an arrangement is to make the weight force exerted by the applied load sufficiently smaller through lever reduction, so that the measurement transducer generating the compensation force will be able to produce a measurement signal representing the weight force. According to the state of the art, the connections between the individual elements in high-resolution weighing cells are designed as flexure pivots. A flexure pivot defines an axis of rotation between the two coupled elements. In a weighing cell constructed as a materially continuous unit, also called a monolithic or monobloc weighing cell, the flexure pivots can be formed as narrow material connecting portions.

In a type of EMFR weighing cells where the weight force is compensated directly, i.e. without a lever reduction of the compensation force, the parallel-guiding mechanisms are in most cases configured as spring elements, specifically as flexible links or diaphragm springs. In weighing cells of this type, which are also referred to as direct measuring systems, the measurement transducer counteracts the weight force of the load with a compensation force of equal magnitude.

The measurement transducer of an EMFR weighing cell of the current state of the art is normally configured as a current-conducting coil immersed in the air gap of a permanent magnet, so that the weight force of the weighing object can be determined from the corresponding electrical variable, i.e. the coil current I. As the weight force is proportional to the compensation force and the latter is, in turn, proportional to the coil current I, it follows that the coil current I is also proportional to the weight force and thus proportional to the mass of the weighing load. When the weighing cell is in equilibrium, this relationship can be expressed by the equation (not accounting for temperature effects):

$$F' = f(I) = k \times I$$

where
F': is the calculated weight force of the mass m being weighed;
K is the transfer constant, and
I is the coil current.

The transfer constant k is specified in the design for every type of weighing cell and is stored in a processing unit for the calculation of the compensation force. In other words, the transfer constant depends on the load-receiving system of the weighing cell and describes the conversion of a measured coil current into a force F'.

In measurement transducers of the type that is normally used in an EMFR weighing cell, the current-conducting coil moves in the air gap of the permanent magnet under the influence of the Lorentz force, i.e. the force acting on an electrical charge that moves in a magnetic field which in this case manifests itself as the compensation force of the coil. A current which flows in an electrical conductor such as a coil winding in a transverse direction to the trajectories of a surrounding magnetic field will cause a force to act on the conductor, and thus on the coil of the measurement transducer.

The magnetic field of the permanent magnet should ideally be homogeneous, a condition which is not met in practice in most cases. The magnetic field can vary to some extent for different positions of the coil relative to the permanent magnet. In other words, with a current of a given magnitude the compensation force generated by the coil is position-dependent. This needs to be taken into account in the calculation of the weighing result. If the balance beam is not in the equilibrium position for which the transfer constant k was determined, but slightly above or below, the stored transfer constant will deviate from the actual transfer constant. If a weighing cell is exposed to shocks, vibrations and the like, the deviation of the transfer constant will affect the fast and precise determination of the weighing result and there can be deviations of the zero point. Particularly in dynamic checkweighing scales, this problem occurs with increased severity.

To mitigate this problem, electronic filters that act on the signal representing the compensation force are used in state-of-the-art force-measuring devices. In the operating state of a force-measuring device, the calculation of the compensation force is adapted to the ambient conditions by applying a correction based on temperature dependencies of the magnet and of the spring constants of the flexure pivots. Also taken into account are dynamic effects associated with switching the device on and with a change of the weighing load. Furthermore, time-dependent phenomena are also included in the compensation. The calculation of the weight force of the mass on the load receiver can be mathematically expressed as a function):

$$F' = f(I, T, t).$$

This function, which is also called transfer function, serves to convert the signals of the coil current and of different temperature sensors into a time-dependent output value which is presented on a display. Accordingly, the transfer constant is part of the transfer function. The coil current is regulated by a position-controlling unit according to the following function:

$$I=f(F,z,T,t),$$

which in addition to temperature effects (T) and dynamic effects (t) also takes possible interference parameters (z) into account.

A dynamic checkweighing scale is a system that serves to weigh products in a production line while they are moving over the scale, to classify the products into given weight classes, to sort and/or eliminate the products according to weight class. Checkweighing scales are used in a wide variety of applications. These include, for illustrative purposes only: checking for overweight and underweight products; complying with legal requirements for the net contents of packaged goods; reducing product waste by using the weight data collected by the checkweighing scale to adjust the settings of the filling machines; classifying products by weight; measuring and recording the performance of the production facility or the production line; and verifying the piece count based on weight.

The purpose of checkweighing scales is to weigh 100% of the products of a product line. In consequence, data for the entire production output are collected to count the number of units produced, to keep production lots traceable, or for production statistics.

A checkweighing system normally consists of an infeed conveyor, a weighing conveyor, an outgoing conveyor with a sorting device, and a weighing terminal with a user interface. The weighing conveyor, which is located between the infeed conveyor and the outgoing conveyor, is supported by a weighing cell which weighs the product as it moves over the weighing conveyor.

In the operation of a dynamic checkweighing scale, the product moves from the infeed conveyor belt to the weighing conveyor belt, where it is weighed while in motion, and then travels on by way of the outgoing conveyor. The time available to determine the weighing result depends on the length and the transport velocity of the weighing conveyor. The weighing conveyor belt, which is supported by the weighing cell, receives the weight of the product as it arrives from the infeed conveyor and is relieved again of the weight as the product changes over to the outgoing conveyor. In the continuous weighing of products, the weighing cell is therefore subjected to alternate loading and unloading. This alternating load leads to oscillations of the conveyor belt which have a noticeable effect on the weighing result because of the very short time interval during which the product rests completely on the conveyor belt.

To obtain a weighing result more quickly in the presence of oscillations or vibrations, a concept of using two weighing cells simultaneously is proposed in EP 0 430 695 A2. A first weighing cell receives the weighing load and, based on the compensation force generated, sends a corresponding signal to a processing unit. A second weighing cell has the function to send to the processing unit a signal that reflects the behavior of the first weighing cell under the same oscillations or vibrations with a standard weight. The processing unit subtracts the signal of the second weighing cell from the signal of the first weighing cell and thus cancels the oscillations and vibrations in the signal of the first weighing cell, whereby the weighing result is produced. This concept has the disadvantage that two weighing cells are needed for each weigh station, which adds significantly to the manufacturing cost. One also needs to keep in mind that the two load cells may not have exactly equal amounts of inertia, that the response to oscillations and vibrations may therefore be different for the two weighing cells, so that the weighing result cannot be corrected entirely.

Deviations of the zero point can also be found in microbalances, most of which have force-measuring cells operating according to the principle of electromagnetic force-compensation. These balances are capable of measuring a weighing load of 10 grams with a measurement resolution of 0.001 milligrams, i.e. with a precision of one part in 10 million. Therefore, even the smallest vibration originating from the environment, for example, elevators in the building, will be enough to cause a deviation of the zero point. The zero point deviation appears to the user as an increase of the indicated display value which returns to normal only gradually after the disturbance has subsided. In measurements that extend over a long time period, an event of this kind can render an entire measurement serious unusable.

Another approach to reduce the influence that oscillations or vibrations have on the weighing result involves setting the balance on a heavy table or support structure with an elastic damping system. This method is preferred at locations or weighing stations where microbalances are used. This solution, too, raises the procurement cost for setting up a weighing station.

Solutions according to the existing state of the art in which only the coil current is used as a basis to calculate the weighing result, as described for example in EP 0 359 978 A3 have the disadvantage that at the time when the weighing result is calculated from the coil current, the balance needs to have reached its settling position or, more specifically, the position where the linearized weighing result agrees with the measured coil current. Every time there is a disturbance such as for example an oscillation or vibration, the force-measuring device is destabilized from its exact settling position, and this can give rise to zero point deviations.

The term "oscillations" as used here refers to dynamic deviations of status variables of the system from a mean value, also called fluctuations. The term "vibrations" in the present context refers to periodically alternating movements of the system that are mostly in the intermediate to high frequency range and of low amplitude.

In US 2003/0229600 A1, a method is disclosed for the rapid weighing of objects, wherein a platform with a weighing cell delivers an output signal to an analog/digital converter. The resultant digital output signal is processed by way of a low-pass filter and analyzed by a microprocessor in order to determine the weight of objects on the platform. The smoothing of the measured coil current with suitable electronic filters is known as a means to stabilize the weighing result that is to be calculated. The drawback here is that the speed and the accuracy of the method depend on the filter parameters and are in most cases mutually exclusive, meaning that an accurate determination of the weighing result takes more time and, conversely, that a fast determination of the weighing result is less accurate.

The present invention has the objective to provide a method whereby the weighing result can be determined quickly and at the same time precisely.

In addition, the invention aims to provide the capability to quickly obtain a precise weighing result in the presence of strong vibrations and/or vibrations originating from the ambient environment.

SUMMARY

According to the invention these tasks are solved by a method of determining a weight force with a force-measuring device that is based on the principle of electromagnetic force compensation, as set forth in the appended claims.

The method of determining the weight of an applied load is designed to be carried out on a force-measuring device which operates according to the principle of electromagnetic force compensation and includes a measurement transducer with a coil that is movably immersed in a magnet system and can carry an electrical current, and which further includes a force-transmitting mechanical connection between a load-receiving part and the coil or magnet system of the measurement transducer as well as a position sensor that serves to determine a displacement of the coil from its settling position relative to the magnet system which occurs as a result of placing the load on the load-receiving part. The electrical current flowing through the coil has the function to generate the electromagnetic force between the coil and the magnet system whereby the coil and the load-receiving part that is connected to the coil or the magnet system are returned to, and/or held at, the settling position. The magnitude of the electrical current and the amount of displacement of the coil from its settling position are used to determine the weight force of the applied load.

As a result of the invention, the force-measuring device provides the capability to take the amount of displacement of the coil from its settling position into account in the calculation of the display value, as the displacement of the coil from its settling position is sent as an additional input to the processing unit. This makes it possible to also include nonlinearities in the calculation of the weighing result, such as for example the inhomogeneity of the magnet system as well nonlinearities of the position measurement, the parallel-guiding linkage, specifically the flexure pivots or elastic links, or of the diaphragm springs, as well as nonlinearities in the lever transmission ratio if the force-measuring device includes a lever system.

The measurement transducer can be arranged in different ways in the force-measuring device. The coil is either attached or has a connection to the movable parallel leg and the magnet system is either attached or has a connection to the stationary parallel leg. Alternatively, the coil is attached or has a connection to the stationary parallel leg and the magnet system is attached or has a connection to the movable parallel leg. In either case, the coil and the magnet system can move relative to each other. The electrical current flowing through the coil, which is in most cases regulated by a PID control loop, generates in both cases an electromagnetic force between the coil and the magnet system, whereby the coil is returned to, or held at, its settling position relative to the magnet system when a load is placed on the load-receiving part. The coil, which is arranged so as to be movable relative to the magnet system, can have one or more coil windings. The magnet system itself can be a permanent magnet or an electromagnet energized by a current. The most common arrangement is to attach the magnet system to the stationary part and to connect the coil directly or through one or more levers to the load-receiving part. This configuration suggests itself in most cases, because the smaller inertial mass of the coil allows the latter to be returned faster to, and to remain more stable in, the settling position. However, there are also force-measuring devices in existence where the magnet system is arranged as a permanent magnet on the movable part, for example as a way to simplify the delivery of electrical current to the coil.

The settling position is the position of the coil relative to the magnet system where all of the forces acting on the system are in equilibrium with each other. In lever systems, this is also the zero position of the balance beam. As the coil is connected to the balance beam, a deviation of the balance beam from the settling position goes together with a deviation of the coil from its settling position. The same applies if the magnet system instead of the coil is connected to the balance beam. The term "balance beam" as used herein in the context of the force-transmitting mechanical connection refers to the one- or two-armed lever whose settling position is monitored by the position sensor. Preferably, the fulcrum axis of the balance beam, the mass center of gravity of the balance beam, the connection of the first lever arm to the coupling member and the point of application of the force generated by the measurement transducer lie in a common plane. If this condition is met, the balance beam in the absence of a weighing load is not subjected to any torque and is always in equilibrium independent of an out-of-level condition of the supporting base. The plane that is defined by the aforementioned points is also referred to as the level-indifferent plane.

In a direct-measuring system, the coil or the magnet system of the measurement transducer is attached to a force-transmitting rod which is connected directly to the load-receiving part, meaning that there are no levers for the reduction of the applied force. A displacement of the coil or of the magnet system from the settling position in a direct-measuring system is the same as a displacement of the force-transmitting rod from its settling position.

A preferred application for a method according to this inventive concept is in microbalances, as the stability of the force-measuring device in the presence of oscillations and/or vibrations is thereby improved.

The method is also particularly well suited for check-weighing scales, because it is a frequent occurrence in this case that the conveyor belt of the checkweigher is excited into oscillations and/or vibrations by the incoming and outgoing products being weighed.

The invention is suitable for force-measuring devices with measurement transducers that generate the compensation force according to the push principle as well as those that operate according to the push/pull principle. The difference lies in the way the compensation force is generated: a push system can generate a compensation force only in one direction, while a push/pull system has the capability to generate a compensation force in both directions.

According to one embodiment of the invention, the amount of the displacement of the coil from its settling position is measured and quantified by the position sensor which provides the input signal to a position-controlling unit which regulates the electrical current through the coil in such a way that the coil and the load-receiving part connected to the coil or the magnet system are returned to the settling position by the electromagnetic force between the coil and the magnet system. Alternatively, the amount of displacement of the coil from its settling position can also be determined with an additional position sensor. The simplest way of measuring the displacement of the coil from its settling position is to use the position signal of the position sensor of the position-controlling unit. However, it is also possible to use additional sensors which deliver the same information regarding the position of the balance beam or the displacement of the coil from its settling position within the magnet system or the displacement of the balance beam from its settling position. This sensor signal could be provided for example by an acceleration sensor, a velocity sensor, an angle-measuring sensor or a position sensor, in order to supply the respective information to a processor unit.

To determine the weight force of the applied load in accordance with an advantageous embodiment of the invention, a transfer means is used in the form of an arithmetic instruction which is stored in a processing unit and which establishes a correlation between the magnitude of the current, the magnitude of the displacement of the coil from its settling position, and the weight force. The term "transfer means" is used here in the sense of a mathematical instruction according to which the processing unit transforms the available input quantities into a display value, i.e. calculates the value of the weight force F'.

According to a further developed embodiment of the invention, the transfer means is stored as a transfer table in which the amount of the displacement of the coil from its settling position and the magnitude of the coil current are correlated with values of the weight force of the applied load. A further possibility is to store the transfer means as a transfer function which has at least one parameter and uses as input quantities at least the magnitude of the displacement of the coil from its settling position and the magnitude of the coil current.

If a transfer table is used as instruction for the calculation, the display value is found in a table which lists display values as a function of the amount of the displacement of the coil from its settling position and the magnitude of the electrical coil current. The term "transfer function" as used here means a mathematical function with at least two input quantities and at least one parameter. Within the context of the invention, the at least one parameter of the transfer function is understood as a variable of a mathematical function which describes the relationship between the magnitude of the displacement of the coil from its settling position and the magnitude of the electrical coil current.

According to a further embodiment of the invention, the at least one parameter of the transfer function is stored as a parameter table and/or as a characteristic curve of the system. Here, too, the appropriate parameter is selected from a parameter table dependent on the amount of the displacement of the coil and the magnitude of the electrical coil current or, in the case of a system graph, as a parameter that describes the system graph.

In another advantageous embodiment of the invention, the at least one parameter of the transfer function is load-dependent.

According to an advantageous embodiment of the invention, the values of the transfer table and/or the at least one parameter of the transfer function are determined by varying the displacement of the coil and by measuring in essence simultaneously the magnitude of the electrical coil current associated with the displacement of the coil, and/or by varying the magnitude of the electrical coil current and by measuring in essence simultaneously the displacement of the coil associated with the magnitude of the electrical coil current, and/or by analyzing the displacement of the coil relative to the magnitude of the electrical coil current in the presence of vibrations.

The concept of determining the values of the transfer table and/or the at least one parameter of the transfer function through an analysis in the presence of vibrations is used with special preference in the case of checkweighing scales.

According to another aspect of the invention the determination of the values of the transfer table and/or the determination of the at least one parameter of the transfer function is made both with and without a weight being placed on the load-receiving part, wherein the weight can be either a weight that is set on the load-receiving part from the outside or a weight that can be engaged internally by means of a mechanism. Determining the values and/or the at least one parameter under different load conditions improves the accuracy of the output value over the entire weighing range of the gravimetric measuring device.

According to an especially advantageous embodiment of the invention, the transfer means is produced individually for each force-measuring device, or generically for force-measuring devices of the same type. Obviously, due to the manufacturing tolerances for the magnet system, the flexure pivots, the position measurement and the lever reduction ratio, each individual unit has its own values and/or parameters which will only be valid for the one specific force-measuring device. To speed up the determination of these values and/or parameters in the production of the force-measuring devices, a generic transfer means based on the arithmetic mean of the previously determined transfer means can be stored in memory in the processing unit.

A force-measuring cell of a gravimetric force-measuring device for the determination of a weight force according to the electromagnetic force compensation principle which includes a measurement transducer with a coil that is movably immersed in a magnet system and further includes a force-transmitting mechanical connection between the measurement transducer and a load-receiving part, wherein either the coil or the magnet system is connected to the load-receiving part, is distinguished by the fact that the force-measuring cell has a position sensor capable of detecting and of measuring a displacement of the coil from its settling position which is caused by placing a load on the load-receiving part, wherein the amount of the displacement of the coil from its settling position can be used in a process of determining a weight force.

In a computer program for the implementation of the method of determining a weight force by means of a force-measuring device that operates according to the electromagnetic force compensation principle, a display value of the weight force is produced as output. The force-measuring device includes a coil that is movably immersed in a magnet system and can carry an electrical current that generates an interactive force between the coil and the magnet system whereby the coil and the load-receiving part that is connected to the coil or the magnet system is returned to and/or held at the settling position, and further includes a force-transmitting mechanical connection between the coil and a load-receiving part, and also includes a sensor capable of detecting a displacement of the coil from its settling position which is caused by placing a load on the load-receiving part. The input quantities that enter into the computer program include at least the magnitude of the electrical coil current and the amount of the displacement of the coil from its settling position.

A preferred embodiment of the computer program additionally uses a time signal and at least one temperature signal as input quantities. This ensures that temperature effects on the magnetic field of the magnet system and/or changes in the lever transmission ratio due to thermal expansion and/or changes in the elastic restoring forces of the flexure pivots can also be taken into account. A time signal is used for the compensation of dynamic effects in the switch-on phase or during a change of the load, or for time-dependent compensations.

In a further embodiment of the computer program, the latter can call up a transfer means which can be stored in the working memory of the unit that is executing the program.

When the computer program is used in a checkweighing system with an infeed conveyor belt to bring the weighing objects to the scale, an outgoing conveyor belt to transport the weighing objects away from the scale, and a weighing conveyor belt which is connected to a force-measuring device, the determination of the weight force is performed in a terminal by means of a computer program.

BRIEF DESCRIPTION OF THE DRAWINGS

In the following, the subject of the invention is further explained through examples of preferred embodiments which are illustrated in the attached drawings, wherein identical parts are identified with identical reference number sand wherein:

FIG. 3 shows a block diagram which helps to describe the sequence of functions in a force-measuring device according to the invention;

DETAILED DESCRIPTION

In the following description, features with the same function and similar configuration are identified by the same reference symbols.

Figure 1:
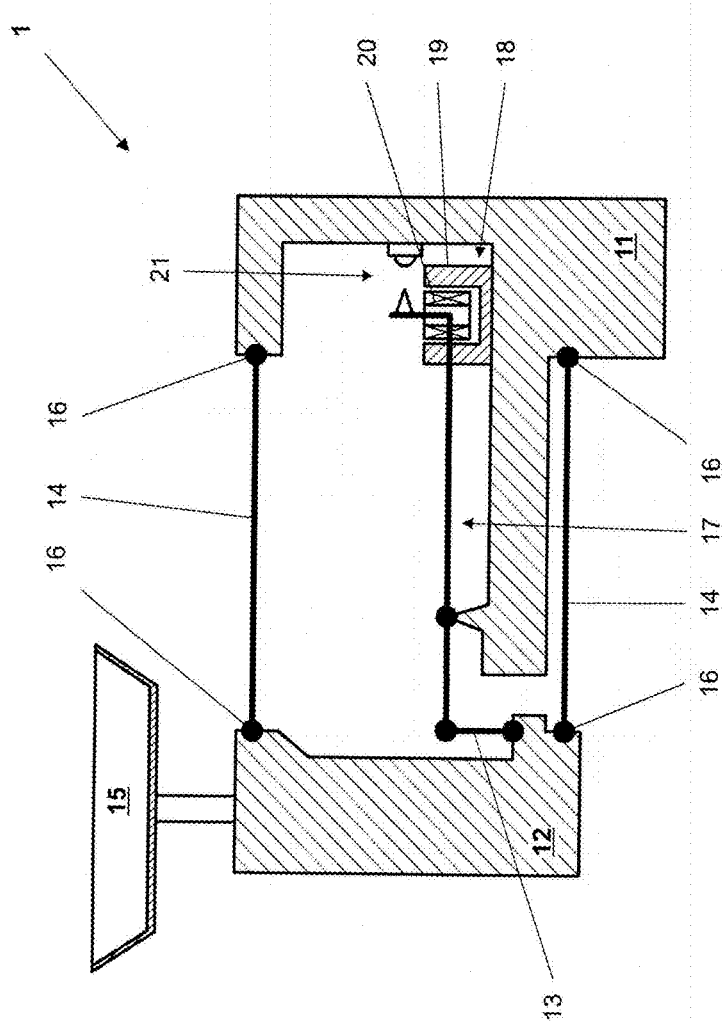
FIG. 1 schematically illustrates, in a laterally directed sectional view, a force-measuring cell of a top-loading force-measuring device configured as a lever system.

FIG. 1 schematically illustrates a force-measuring cell of a force-measuring device 1, in a sectional view from the side. By way of the stationary part 11, the force-measuring device 1 is mounted on a supporting structure. The load-receiving part 12, which is connected to the stationary part 11 by two parallel guides 14, carries a weighing pan 15 on which the weighing load is placed. The parallel guides 14 are connected by flexure pivots 16 to the load-receiving part 12 and to the stationary part 11. A flexure pivot defines an axis of rotation, but in any direction transverse to the axis of rotation, the flexure pivot behaves as a practically rigid force-transmitting element. The force-measuring device 1 is not limited to the illustrated configuration with the weighing pan on top but can also be configured with the weighing pan arranged below, in most cases suspended by way of a hanger. The coupling 13 transmits the weight force to the first lever arm of the balance beam 17 which is supported by a fulcrum. Arranged at the other end, the outer extremity of the second lever arm of the balance beam 17, is the measurement transducer 18 which generates a compensation force 25 to counteract the lever-reduced weight force. The measurement transducer 18 illustrated here is shown as a current-conducting coil 20 which is movably immersed in a magnet system 19. If the compensation force 25 generated by the measurement transducer 18 and acting on the second lever arm corresponds to the weight force acting on the first lever arm, the balance beam 17 is in equilibrium and thus in the settling position. This settling position is monitored by a position sensor 21.

When a mass is placed or a force is acting on the balance pan 15, the load-receiving part 12 moves downward, parallel to the stationary part 11, constrained by the parallel guides 12. The balance beam 17, which is connected to the load-receiving part 12 through the coupling member 13, transmits the movement of the load-receiving part 12 with a defined reduction ratio to the other end of the balance beam 17 which faces towards the measurement transducer 18. The position sensor 21, detecting a displacement of the coil 20 from its settling position, generates a corresponding position signal 22. The position signal 22 is sent as input signal to the position-controlling unit 23 which generates and controls an electrical current 24 through the coil 20 in such a way that the coil 20 and the balance beam 17 are returned to their settling position. After the coil 20 has settled back into a stationary state in the settling position, the magnitude of the coil current represents a measure for the mass or force imposed on the load-receiving part 12. The current 24 is measured; the display value 27 is calculated by means of a processing unit 26 and subsequently presented on a display panel.

Figure 2:
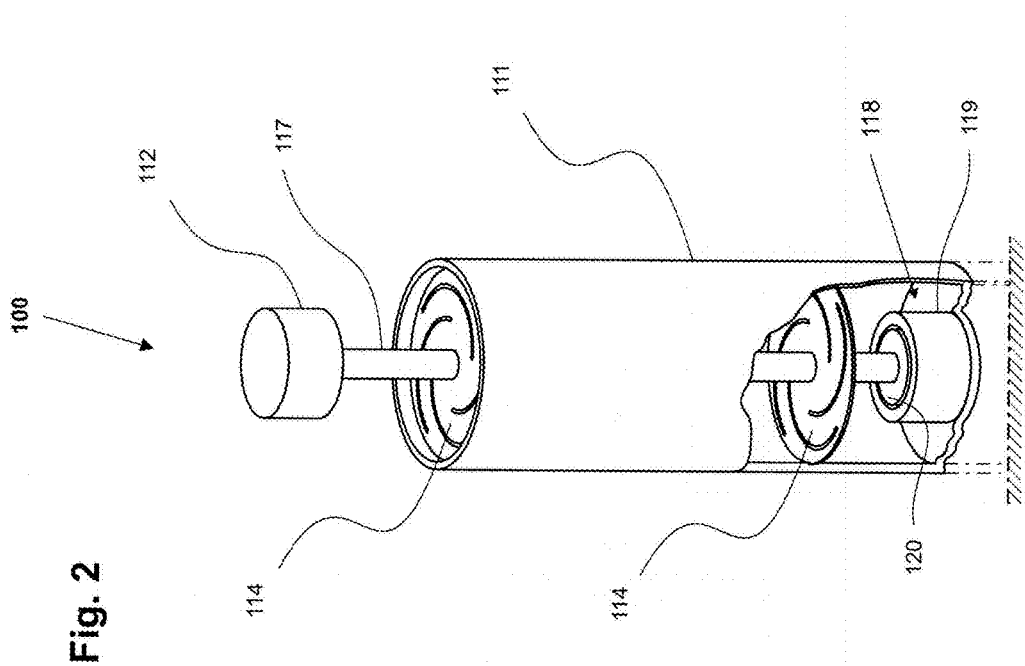
FIG. 2 shows a force-measuring cell configured as a direct-measuring system.

FIG. 2 shows a possible configuration of a force-measuring cell 100 as a direct-measuring system. The stationary parallel leg 111 is supported by a base structure. The movable parallel leg 112, which serves to receive the load, is connected to the force-transmitting rod 117 and movably constrained by parallel guides 114, which in the example of FIG. 2 have the form of diaphragm springs. In the illustrated embodiment, the measurement transducer 118 is arranged at the lower end of the force-transmitting rod 117, with the coil being connected to the movable parallel leg 112 and the magnet system 119 being attached to the stationary parallel leg 111. In possible alternative configurations the measurement transducer 118 could be arranged in the space between the parallel guides 114 and/or by switching places between the magnet system 119 and the coil 120.

FIG. 3, which has the form of a block diagram, illustrates the sequence of functions in a force-measuring device according to the state of the art and in a force-measuring device 1 according to the invention. A load that is placed on the pan 15 exerts a force F on the load-receiving part 12, 112 which causes a displacement from the settling position of the balance beam 17 and the coil 20 or the magnet system 19 that is connected to the balance beam 17, or of the force-transmitting rod 117 and the coil 120 or the magnet system 119 that is connected to the transmitting rod 117. In other words, these elements take on a different position. The new position x is determined by the position sensor 21 and a corresponding position signal 22 is sent to the position-controlling unit 23. Based on the position signal 22, the position-controlling unit 23, which in most cases includes a PID controller, continuously determines the magnitude of coil current 24 required to return the system to the settling position. As a result of the coil current 24, the coil 20, 120 produces a magnetic field and generates a compensation force 25 acting between the magnet system 19, 119 and the coil 20, which moves, respectively, the balance beam 17 or the force-transmitting rod 117 back to the settling position. The same chain of events repeats itself continuously, whereby the system is regulated or held at the settling position. This control loop corrects the displacement of the balance beam 17 or of the force-transmitting rod 117 dynamically, i.e. several times per second, for example in the frequency range from 500 Hz to 10 kHz.

Since the coil current 24 represents a direct measure for the compensation force 25, the weight force of the load on the load-receiver is calculated by the processing unit 26 based on the measured value of the coil current 24 and presented as the display result 27. The calculation of the display value 27 also includes additional factors such as for example the ambient temperature and the magnet temperature as well as time-dependent dynamic effects.

In force-measuring devices 1 of the state of the art, the display value 27 is calculated according to an equation of the form:

$$F=f(I,T,t)$$

wherein the coil current 24 and the temperature-related factors enter into the calculation as independent parameters. In addition, the calculation includes time-dependent operations to compensate for dynamic effects occurring during the power-up phase or with a change in the load. This aspect is addressed in a transfer function with constants that are specific to a given type of force-measuring cell and include, among other factors, the lever ratio of the balance beam 17 for the conversion from the compensation force 25 of the coil 20 to the weight force or the mass placed on the load-receiving part 12. In order to continuously present a display value 27 on the display panel rather than only when the balance beam 17 or the force-transmitting rod 117 is exactly at the settling position, the display value 27 in state-of-the-art force-measuring devices is electronically filtered, i.e. a time dependent mean value is formed by means of the transfer function. The coil current is regulated by a position-controlling unit in accordance with the following function:

$$I=f(F,z,T,t)$$

which in addition to the effects of temperature (T) and dynamic effects (t) also takes possible disturbance quantities (z) into account.

Some of the constants of the transfer function are stored in the processing unit 26 at the factory after the assembly process of the force-measuring device has been completed. These constants are valid only for the stationary state in the regulation of the coil at the settling position 20, 120 because, as mentioned earlier, the magnetic field of the magnet system 19, 119 is not perfectly homogeneous or because of non-linearities in the position measurement, in the flexure pivots 16 or in the elastic links or diaphragms, or in the lever reduction.

In the presence of vibrations, oscillations or other disturbances of the force-measuring device 1, a display value 27 for the weight of a load on the load receiver which is calculated only on the basis of the coil current 24 will be subject to errors, because the constants of the transfer function which were calibrated for the exact settling position of the coil 20, 120 are no longer applicable with perfect accuracy. The calculated weight force F' that is based on the magnitude of the coil current 24 at a time when the coil 20, 120 is not at the settling position is therefore different from the actual weight force F of the load on the balance pan.

The method of determining the weight force in accordance with the invention is distinguished by the feature that the processing unit 26 additionally uses the position signal 22 of the position sensor 21, i.e. the amount of the displacement of the coil 20, 120 from its settling position, for the calculation of the display value 27 that corresponds to the weight value of the weight on the balance pan. To mathematically connect the magnitude of the electrical coil current 24 and the amount of the displacement of the coil 20, 120 to the determination of the weight, a transfer means 30 is stored in the processing unit 26 as an arithmetic instruction. This is indicated in FIG. 3 by the broken lines. Instead of the position signal 22, it is also possible to send input signals to the processing unit 26 which contain the same information regarding the position x, i.e. the position of the coil 20, 120 relative to the magnet system 19, 119. This is indicated in FIG. 3 by the dash-dotted line. For example, one could use a second, additional sensor 28 such as an acceleration sensor, a velocity sensor, an angle-measuring sensor or a position sensor, in order to supply the respective information to the processor unit 26. The calculation of the display value 27 according to the method of the invention is thus based on the formula:

$$F=f(x,I,T,t)$$

wherein the temperature T and the timing of the calculation of the display value again have an influence on the display value 27. The force-measuring device 1 thus has the capability to also enter the displacement of the coil 20, 120 from its settling position into the calculation of the display value 27 and, consequently, to also take non-linearities into account, such as for example the inhomogeneity of the magnet system 19, 119 as well as non-linearities in the position measurement, in the parallel guides 14, 114, especially in the flexure pivots 16 or in the elastic links or diaphragms, or in the lever reduction. This improves the quantitative value for the position signal 22, 22' which is taken into account in the calculation of the display value 27, but does not affect the regulating function performed by the position-controlling unit 23.

Figure 4:
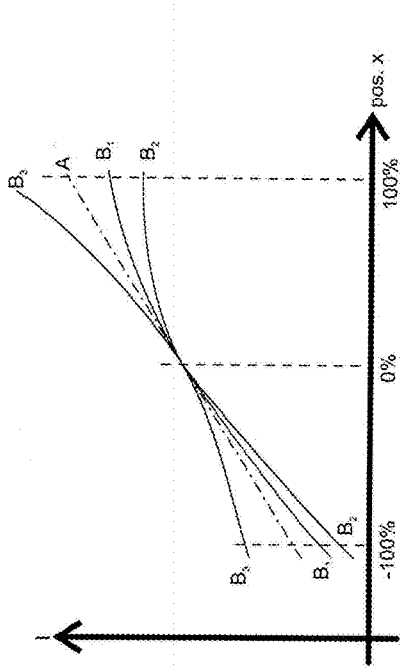
FIG. 4 represents a position/current graph covering the entire range of displacement of the coil, with a transfer function A and a transfer function $B_i$.
Figure 5:
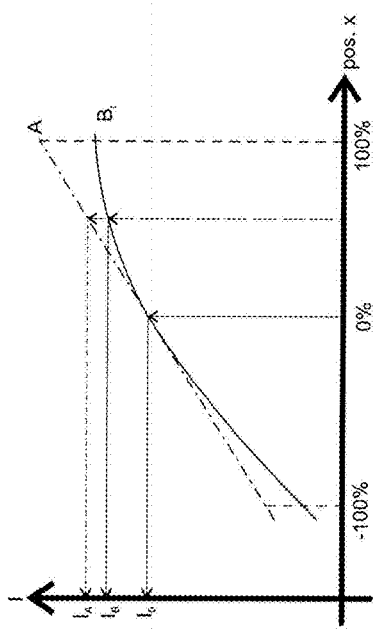
FIG. 5 represents a position/current graph covering the entire range of displacement of the coil, with a transfer function A and the transfer functions $B_1$, $B_2$ and $B_3$.
Figure 6:
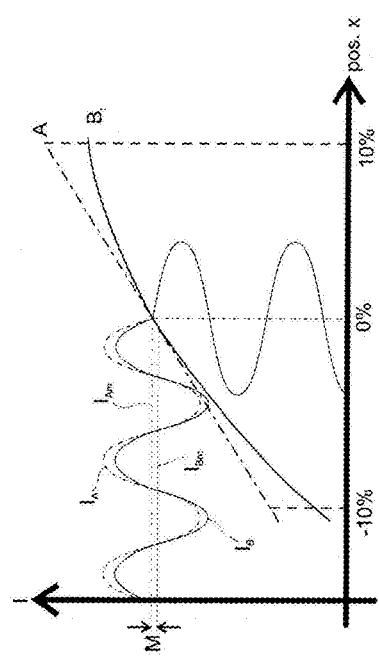
FIG. 6 represents a position/current graph covering a section of the displacement range in the vicinity of the settling position, with a transfer function A and a transfer function $B_i$, in the presence of coil oscillations.

FIGS. 4 to 6 show system-characteristic curves in the form of position/current diagrams for different force-measuring devices 1 and how they affect the calculation of the display value 27 in the processing unit 26. Each of the diagrams shows the system-characteristic curve A of an idealized force-measuring device 1 with an ideal behavior of the flexure pivots 16 or elastic links and of the magnet system 19, 119, and one or more system-characteristic curves $B_i$ for a force-measuring device 1 with an ideal behavior of the flexure pivots 16 or elastic links and a reality-based behavior of the magnet system 19, 119. The marks for 100% and −100% and for 10% and −10% on the horizontal axis define the displaced position of the coil 20, 120 relative to the magnet system 19, 119.

In FIG. 4 the system-characteristic curve A is shown as a straight line, which means that under ideal conditions a displacement of the coil 20, 120 from its settling position translates into a change of the current 24 in a linear relationship. In contrast to this, the system-characteristic curve $B_i$ reflects the actually occurring situation, i.e. the aforementioned inhomogeneity of the magnet system 19, 119. If a force F is exerted on the load-receiving part 12, 112, the position x changes and the position-controlling unit 23 receives a corresponding position signal 22 from the position sensor 21. Based on the measurement of the coil current $I_A$, the processing unit 26 calculates the display value 27 as indicated in FIG. 4 by the broken-line arrows. Once the coil 20, 120 has returned to the settling position at the end of the regulating action, the current $I_0$ measured at that time will be proportionate to the force F acting on the load-receiving part.

As mentioned above, the system-characteristic curve A falls short of reflecting the actual situation, i.e. it is only an inaccurate representation of the real behavior. Due to the inhomogeneity of the magnet system 19, 119 and the non-linear restoring forces of the flexure pivots 16 or elastic links, a transfer function of at least the second order, as illustrated by the graph $B_i$ in FIG. 4, is required in order to represent the actual behavior. Thus, when the processing unit receives the position signal 22, 22', it should in actuality calculate a display value 27 that corresponds to the coil current $I_B$. The discrepancy between the system-characteristic curves A and B is smaller in the vicinity of the settling position, as the system-characteristic curves are matched to the behavior of the magnet system 19, 119 around the settling position. The consequence of using a graph A is that the processing unit 26 would be supplied with an incorrect current signal for the calculation of the display value.

To correct this problem in the calculation of the display value, the processing unit 26 according to the invention uses additionally, i.e. besides the magnitude of the coil current 24, the position signal 22 of the position sensor 21 (or the position signal 22' of the position sensor 28) and a transfer means 30 which is stored in an internal memory of the processing unit 26. The transfer means 30 can for example have the form of a transfer function or a transfer table. This means that the transfer means 30 according to the invention includes the values of the previously mentioned transfer factor k for a plurality of positions x within the entire displacement range of the balance beam 17 or the force-transmitting rod 117. In the calculation of the display value 27, the processing unit 26 selects the transfer factor 27 based on the position signal 22, 22' received by the processing unit 26 and based on the load on the load-receiving part. In other words, the transfer means 30 is a computing instruction which depends, among other things, on the position x and thus establishes a correlation between the magnitude of the electrical coil current 24 and the amount of displacement of the coil 20, 120 from the settling position.

It has been found that a transfer means 30 as described above depends on the mass of the weighing load, which means that the parameters of the transfer means 30 are associated with specific amounts of the weighing load. This is illustrated in FIG. 5 with different transfer functions $B_1$, $B_2$ and $B_3$. The stronger the force that is exerted on the load receiver 12, 112, the more the transfer function $B_i$ will be curved away from the straight-line graph A. The graph of the transfer function $B_3$ is curved upwards. This shape is characteristic for a measurement transducer 18, 118 in which the force reverses its direction, as is the case for example in push/pull systems. The transfer means 30 therefore includes at least one transfer function with the corresponding parameters which is used for the determination of the display value 27 at the point where the transfer function most closely agrees with the force acting on the load receiver, or an interpolation is made between the respective parameters of two transfer functions.

FIG. 6 illustrates the effects of oscillations and/or vibrations centered at the settling position. The area around the settling position has been enlarged, so that the visible part of the x-axis extends only from −10% to +10% of the range of the position x. The oscillation of the position signal 22, 22' is shown in approximation as a sinus curve that is symmetric relative to the settling position. In an idealized force-measuring device 1 with the system-characteristic curve A, the oscillation will cause a current $I_A$ that oscillates about the mean value $I_{Am}$. With a behavior as it occurs in reality and is illustrated by the system-characteristic curve $B_i$, the oscillatory signal of the position x translates into a coil current signal $I_B$. This current signal $I_B$ which reflects what occurs in reality is an asymmetrically distorted signal that was converted by the transfer function, resulting in a deviation M of the mean value of the current $I_B$ in relation to $I_A$.

In the comparison of the two mean values of the currents $I_A$ and $I_B$, a deviation M of the mean value becomes apparent. Without the method of this invention, the display value 27 would therefore also be subject to a deviation. This deviation M is indicated on the ordinate axis (I-axis) in FIG. 6 by two mutually opposed arrows.

To enable the processing unit 26 to calculate the display value 27 in accordance with actual behavior, a transfer means 30 is stored in the memory of the processing unit. The transfer means 30 defines the computing instruction for the display value 27 with the position x and the coil current 24 as input variables and also includes parameters. As previously mentioned, it can have the form of a transfer function or a transfer table.

The values and/or parameters of a transfer means 30 can be determined according to one of the following approaches. Advantageously, the determination of the values and/or parameters of the transfer means 30 is performed in the course of the production process of the force-measuring device 1, specifically during the adjustment phase. A transfer means 30 can be produced individually for each force-measuring device 1, or a generic transfer means 30 can be determined for force-measuring devices 1 of the same type. The generic transfer means can be based on the arithmetic mean of a plurality of previously determined transfer means 30 which can subsequently be used for all force-measuring devices 1 of the same type. Another possibility is to determine the transfer means 30 at the place of installation of the equipment at a customer's facility. This can be accomplished in a short time by using the procedure of the following description.

The term "calibration" is used in the sense of measuring and recording a deviation of a measured value from the true value of the measurement quantity under prescribed conditions without making a physical change. If a change is made to correct the deviation, the term "adjustment" is used. For example in the process of adjusting a balance, a deviation is corrected through manual fine-tuning of its functions by a trained technician making changes in the settings of specific elements, or through a semi-automatic procedure performed by the user, wherein a reference weight, which can be an external accessory or a built-in part of the balance, is placed on the load-receiver, or through an automatic process, if the balance is equipped with an automatically actuated adjusting mechanism.

Among the possibilities for determining the values and/or parameters of the transfer function 30, a first approach is to vary the displacement of the coil 20, 120 and to measure at essentially the same time the magnitude of the electrical coil current 24 associated with the displacement of the coil 20, 120. Alternatively, as a second possible approach, the values and/or parameters of the transfer function 30 can be determined by varying the magnitude of the electrical coil current 24 and by measuring at essentially the same time the displacement of the coil 20, 120 associated with the magnitude of the electrical coil current 24.

As a third possible approach in determining the values and/or parameters of the transfer function 30, the displacement of the coil 20, 120 in the presence of vibrations is analyzed in relation to the magnitude of the electrical coil current 24. This process can be performed during the calibration phase on a vibration table specifically designed for this purpose, or at the place of installation during normal operation of the force-measuring device 1. This third approach of determining the values and/or parameters of the transfer function 30 is used with preference in checkweighing scales.

If the force-measuring device 1 is equipped with an internal calibration weight that is connected to the load-receiving part and can be coupled and uncoupled when a calibration is needed, the force-measuring device has the capability that one or more of the aforementioned possible approaches or the determination of the parameters can be performed either under menu control or autonomously.

Figure 8:
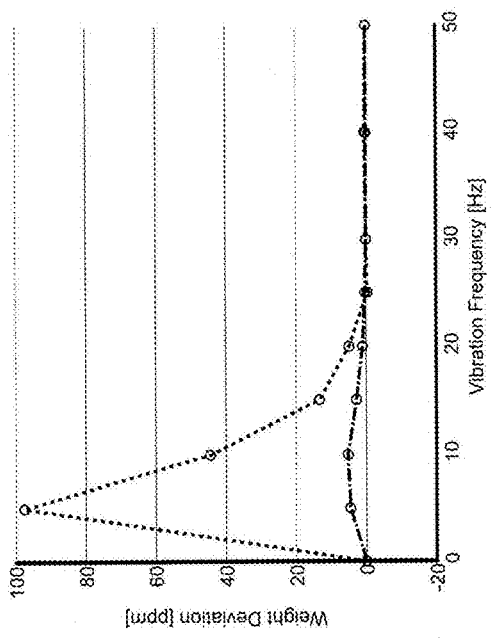
FIG. 8 illustrates in diagram form a comparison between the zero point deviations due to oscillations of a force-measuring device with a weighing range of 0-400 grams for, respectively, a method of the prior art and the method according to the invention, at a weighing load of 400 grams.
Figure 7:
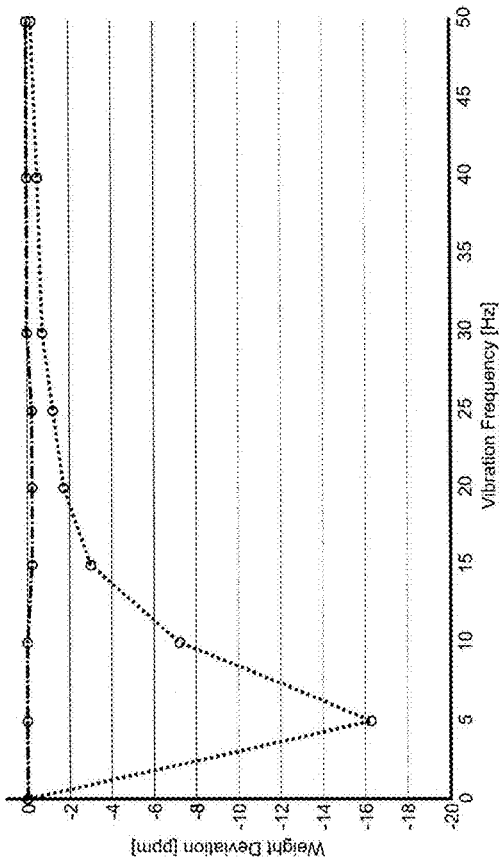
FIG. 7 illustrates in diagram form a comparison between the zero point deviations due to oscillations of a force-measuring device with a weighing range of 0-400 grams for, respectively, a method of the prior art and the method according to the invention, in the absence of a weighing load (zero-load condition)

The graphs in FIGS. 7 and 8 illustrate the improvement of the display value 27 that is achieved by the method of the invention (dash-dotted line) in comparison to a state-of-the-art force-measuring device with a lever system (dotted line) in a balance that oscillates with an acceleration amplitude of about 0.2 m/s$^2$ or 2% of the gravitational acceleration on the earth's surface. This improvement of the display value 27 is also referred to as robustness. The abscissa in the graphs is graduated in units of the excitation frequency (Hz), and the ordinate axis is graduated in parts per million [ppm] of the deviation of the display value 27 relative to the weight of the load on the load receiver. The two graphs of FIGS. 7 and 8 relate to the same force-measuring device 1 which has a weighing range of 0 to 400 grams. FIG. 7 illustrates the behavior when the force-measuring device operates at the zero point, i.e. without a force being exerted on the load receiving part 12. FIG. 8 illustrates the robustness with a weighing load of 400 grams. From both of the FIGS. 7 and 8 it is clearly evident that in the case of this example an enormous, up to ten-fold improvement (i.e. a higher degree of robustness of the force-measuring device 1 against oscillations and/or vibrations) can be achieved at low oscillation frequencies, while at higher frequencies the dash-dotted line (method of the invention) and the dotted line (prior art) asymptotically approach each other.

Figure 9:
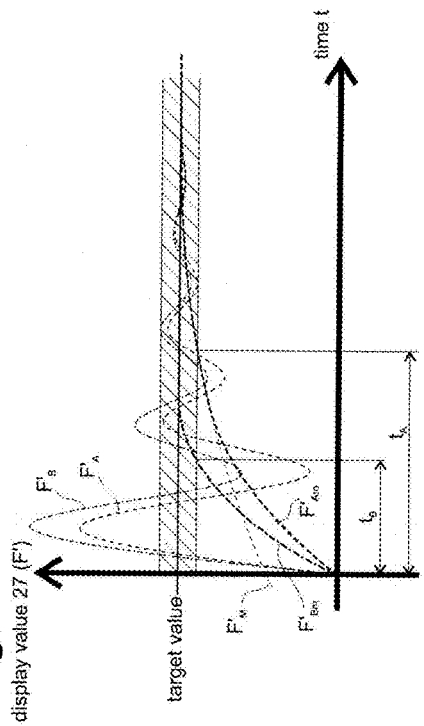
FIG. 9 illustrates in diagram form a comparison between the transient responses of dynamic checkweighing scales operating, respectively, according to a prior-art method and according to the method of the present invention.

By using the method of the invention in force-measuring devices 1 of dynamic check-weighing scales, a faster weight measurement can be achieved as illustrated in FIG. 9. The products that are to be weighed move from the infeed conveyor belt to the weighing conveyor belt and from the weighing conveyor belt to the outgoing conveyor belt. This movement causes an oscillation of the weighing conveyor belt and in consequence also of the display value 27, whereupon the position-controlling unit 23 regulates the coil current 24 in such a way that the balance beam 17 or the force-transmitting rod 117 returns to the settling position. The signal F'$_A$ of the display value of a checkweighing scale with a force-measuring device of the prior art follows an asymptotic curve F'$_M$ which, due to the deviation M of the mean value (see FIG. 6), differs from the end value but gradually settles into the latter as the oscillation subsides and the deviation M of the mean value decreases at the same time. A force-measuring device 1 in which the display value 27 is determined in accordance with the method of the invention settles into the end value from the start. The difference is evident in the two filtered signal graphs F'$_{Am}$ and F'$_{Bm}$, which are obtained with the same electrical filter and reach their respective mean values F'$_A$ and F'$_B$ after about one and a half oscillation periods. While the signal F'$_{Bm}$ is within the tolerance band of the target value already after the time interval t$_B$, the signal F'$_{Bm}$ arrives within the tolerance band only after a time interval t$_A$ which is longer than t$_B$. The tolerance band of the target value defines the threshold value where the display value 27 begins to meet the required precision for the weighing process. Consequently, the sooner the display value 27 arrives within the tolerance band, the faster the articles can be moved across the weighing conveyor belt. Conversely, one could tighten the required precision, i.e. set a narrower tolerance, and still arrive within the tolerance band in the same time t$_A$. With the latter option, the throughput of articles remains the same, while the precision of the display value 27 is increased.

It is known from the prior art that, when the weighing cell is in equilibrium, the display weight force F' is proportional to the compensation force. Further, the compensation force is proportional to the coil current I. As a result, it may be stated that the coil current I is proportional to the display weight force:

$$F'=k \times I.$$

In this equation, the transfer constant k is specified in the design for every type of weighing cell. It is also stored in a possessing unit, such as processing unit 26, so it can be used in the calculation of the compensation force. For this reason, the transfer constant k describes the conversion of a measured coil current I into a force F', that is, the proportional factor of the weighing cell (average ratio).

The amount of coil displacement from the settling position also needs to be considered. For example, FIG. 4 shows a graph of current I as a function of displacement x. Under such a condition, the immediately prior equation can be expressed:

$$F'=k \times I(x).$$

Continuing to review FIG. 4, it may be seen that an idealized measuring device 1, with flexure pivots 16 and magnet system 19, 119 exhibiting ideal behavior, will provide a system-characteristic curve A, which is noted as being linear. The aim of an algorithm that linearizes the load cell is to adapt a real behavior curve, which is notably non-linear, such as system-characteristic curve B of FIG. 4, to operate in the manner of curve A. This allows the immediately prior equation to be restated as follows:

$$F'=k \times (I_{Real}(x)+I_{Comp}(x))$$

At any given point, the coil current is separated into the measured coil current and a compensated coil current, and the immediately prior equation can be rewritten as:

$$F'=k \times (I_B(x)+\Delta I(x)).$$

This allows the idealized system characteristic curve A in FIG. 4 to be expressed as a linear equation of form $$I_A(x)=d \times x+e$$

The real system-characteristic curve B, which is noted above as being of at least second order, so it is of the form:

$$I_B(x)=a \times x^2+b \times x+c$$

which means that $$I_{Comp}(x)=I_A(x)-I_B(x)=-a \times x^2+(d-b) \times x+e-c$$

Substituting, it is seen that the display value F' can be expressed $$F'=k \times (I_B(x)-a \times x^2+(d-b) \times x+e-c)$$

and the real measured coil current is corrected arithmetically by what has been referred to above as a transfer means 30, which is equal to $-a \times x^2 + (d-b) \times x + e - c$ The parameters a through e of the transfer means 30 can each be stored in the processing unit in the form of a transfer table or a transfer function. It will also be recognized that the parameters a through e can be dependent upon the force of the applied load.

These formulas are not contrary to the equations mentioned above where the display value is based on a formula expressed as $$F' = f(x, I, T, t)$$

because the regulation of the coil current, which is done in the position-controlling unit 23 and not in the processing unit 26, already takes temperature, dynamic effects and possible disturbance quantities into account. Thus, it is also appropriate to express the current as:

$$I = f(F, (z), T, t)$$

where F is the force applied. This allows the prior equation to be restated:

$$F' = f_1(x) + f_2(F, (z), T, t)$$

so F' is still dependent on the variables x, I, T and t.

In the prior art known to the inventors, the system-characteristic curve for the weight force calculation would be of the form:

$$I_{Prior\ Art}(x) = 0 \times x + e$$

which is to say that the amount of displacement X is not considered in making the prior art weight force calculation.

Figure 10:
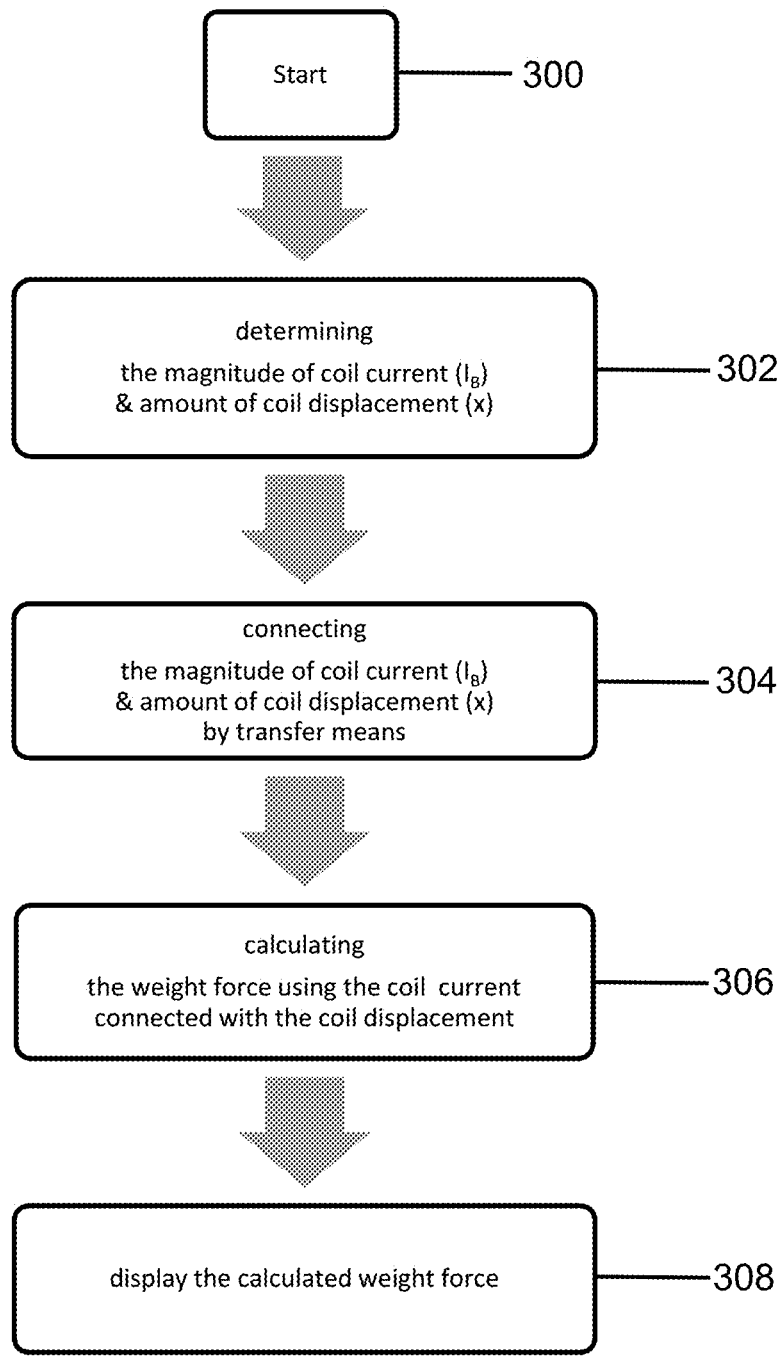
FIG. 10 is a flow chart showing the process for applying a transfer means to calculate the weight force for display.

This process is shown graphically in FIG. 10. In that process, the calculation device is initialized at step 300. The amount of coil current $I_B$ is determined and the amount of coil displacement x is measured at step 302. Using the transfer means 30, the magnitude of the coil current IB and the amount of coil displacement are associated, at step 304. From this association, and using the method recited above, the weight force is calculated at step 306 and displayed at step 308.

Although the invention has been described through the presentation of specific embodiments, it is evident that numerous further variant versions could be created based on the teachings of the present invention, for example by combining the features of the individual embodiments with each other and/or interchanging individual functional units between the embodiments.

What is claimed is:

1. A method for determining a weight force of a load on a force-measuring device operating according to the principle of electromagnetic force compensation, the force measuring device comprising: a measurement transducer, comprising a magnet system and a coil, arranged for movement relative to the magnet system, the coil having a settling position at which the coil resides when all forces acting on the coil are in equilibrium; a load receiving part, arranged to transmit mechanically the weight force exerted thereon to the measurement transducer, through one of the coil and the magnet system; and a first position sensor, arranged to determine an amount of displacement of the coil from the settling position; the method comprising the steps of:

applying a load to the load receiving part, causing the coil to be displaced from the settling position;

determining, using the position sensor, an amount by which the coil is displaced from the settling position;

applying, to the coil, an electrical current of a magnitude calculated to generate an electromagnetic force sufficient to return the coil to the settling position, the calculation achieved from an input signal to a position-controlling unit; and calculating a weight force exerted by the applied load, using both the magnitude of the electrical current and the amount of the coil displacement, wherein a transfer means relates, through an arithmetic instruction that is stored in a processing unit, the magnitude of the electrical current and the amount of the coil displacement to the determination of the weight force, the arithmetic instruction comprising the equation:

$$-aX^2 + (d-b)X + e - c$$

wherein X is the coil displacement and a, b, c, d and e are constants.

2. The method of claim 1, wherein:
the first position sensor that determines the amount of the coil displacement also provides the input signal to the position-controlling unit.

3. The method of claim 1, wherein:
a second position sensor provides the input signal to the position-controlling unit.

4. The method of claim 1, wherein:
the transfer means is stored as at least one of:
a transfer table, in which values of the amount of the coil displacement and values of the magnitude of the electrical coil current are correlated with values of the weight force of the applied load; and
a transfer function, having at least one parameter and using as input quantities at least the magnitude of the electrical coil current and the amount of the coil displacement.

5. The method of claim 4, wherein:
the at least one parameter of the transfer function is stored as at least one of: a parameter table and a system-characteristic curve.

6. The method of claim 4, wherein:
the at least one parameter of the transfer function is load-dependent.

7. The method of claim 4, wherein:
the values of the transfer table and the at least one parameter of the transfer function are determined by at least one of the following methods:
varying the displacement of the coil while measuring essentially simultaneously the magnitude of the electrical coil current associated with the displacement of the coil;
varying the magnitude of the electrical coil current while measuring essentially simultaneously the displacement of the coil associated with the magnitude of the electrical coil current, and
analyzing the displacement of the coil relative to the magnitude of the electrical coil current in the presence of vibrations.

8. The method of claim 7, wherein:
the values of the transfer table and the at least one parameter of the transfer function are determined both with and without a weight being placed on the load-receiving part, the weight being one of: a weight that is set on the load-receiving part from the outside and a weight that is engaged internally by means of a mechanism.

9. The method of claim 1, wherein:
the transfer means is one of: produced individually for each force-measuring device, and produced generically for force-measuring devices of the same type.

10. A force-measuring cell, functioning in accordance with the principle of electromagnetic force compensation, for a gravimetric force-measuring device that determines a weight force according to the method of claim 1.

11. A computer program, implemented on a gravimetric force-measuring device which operates according to the principle of electromagnetic force compensation and the method of claim 1, wherein the program contains an algorithm that:
receives inputs comprising the magnitude of the electrical coil current and the amount of the displacement of the coil from its settling position;
determines a weight force; and
generates, as an output, a display value of the weight force.

12. The computer program of claim 11, wherein the inputs received by the algorithm further comprise:
a time signal; and
at least one temperature signal.

13. The computer program of claim 11 for the implementation of the method of determining a weight force, wherein the algorithm calls up a transfer means, stored in a processing unit of the device, the transfer means comprising an arithmetic instruction functioning to connect the magnitude of the electrical current and the amount of the coil displacement to the determination of the weight force.

14. A checkweighing system for weighing objects, comprising:
an infeed conveyor belt to carry the weighing objects into the system;
a weighing conveyor belt, connected to a force-measuring device;
an outgoing conveyor belt to carry the weighing objects out of the system, and,
a terminal, in communication with the force-measuring device, the terminal having a computer program according to claim 11 implemented thereon.

15. The method of claim 3, wherein:
in the weight force calculating step, a transfer means connects the magnitude of the electrical current and the amount of the coil displacement to the determination of the weight force, the transfer means comprising an arithmetic instruction that is stored in the processing unit.

16. The method of claim 15, wherein:
the transfer means is stored as at least one of:
a transfer table, in which values of the amount of the coil displacement and values of the magnitude of the electrical coil current are correlated with values of the weight force of the applied load; and
a transfer function, having at least one parameter and using as input quantities at least the magnitude of the electrical coil current and the amount of the coil displacement.

17. The method of claim 16, wherein:
the at least one parameter of the transfer function is load-dependent.

* * * * *